United States Patent
Versino et al.

(10) Patent No.: US 7,819,614 B2
(45) Date of Patent: Oct. 26, 2010

(54) DEFORMED SHANK FASTENER

(75) Inventors: Anthony M. Versino, Deerfield, IL (US); Kenneth R. Levey, West Chicago, IL (US); Jeffrey L. Trzaskus, Evanston, IL (US); Lawrence S. Shelton, Morton Grove, IL (US); Donald E. Bergstrom, Lake Villa, IL (US)

(73) Assignee: Illinois Tool Works, Inc., Glenview, IL (US)

(*) Notice: Subject to any disclaimer, the term of this patent is extended or adjusted under 35 U.S.C. 154(b) by 63 days.

(21) Appl. No.: 12/138,180

(22) Filed: Jun. 12, 2008

(65) Prior Publication Data

US 2009/0155021 A1 Jun. 18, 2009

Related U.S. Application Data

(63) Continuation-in-part of application No. 11/956,773, filed on Dec. 14, 2007.

(51) Int. Cl.
  *F16B 15/08* (2006.01)
(52) U.S. Cl. .................................. 411/453; 411/451.3
(58) Field of Classification Search ................ 411/453, 411/454, 456, 451.2, 451.3
  See application file for complete search history.

(56) References Cited

U.S. PATENT DOCUMENTS

| | | | |
|---|---|---|---|
| 398,260 A * | 2/1889 | Husted | 411/456 |
| 1,649,049 A | 11/1927 | Williams et al. | |
| 1,784,754 A | 12/1930 | Rosenberg | |
| 2,327,556 A * | 8/1943 | Purinton | 24/114.4 |
| 2,393,923 A * | 1/1946 | Miller | 411/456 |
| 4,718,802 A * | 1/1988 | Rockenfeller et al. | 411/421 |
| 5,375,957 A | 12/1994 | Golledge | |
| 5,741,104 A | 4/1998 | Lat et al. | |
| 5,749,692 A | 5/1998 | Kish et al. | |
| 6,193,456 B1 * | 2/2001 | Stumpf et al. | 411/180 |
| 6,436,474 B2 | 8/2002 | Godsted et al. | |
| 6,872,042 B2 * | 3/2005 | Panasik et al. | 411/481 |
| 7,395,925 B2 | 7/2008 | Sutt, Jr. | |
| 2009/0155020 A1 * | 6/2009 | Versino et al. | 411/451.2 |

FOREIGN PATENT DOCUMENTS

| | | |
|---|---|---|
| CH | 247777 | 3/1947 |
| DE | 2038885 | 2/1972 |
| FR | 1115028 | 4/1956 |
| GB | 01342 | 8/1856 |
| WO | 2007043985 | 4/2007 |

OTHER PUBLICATIONS

International Search Report dated May 7, 2009 for corresponding International Patent Application No. PCT/US2008/086007.
International Search Report for PCT/US2009/040763 dated Jul. 23, 2009.

* cited by examiner

*Primary Examiner*—Gary Estremsky
(74) *Attorney, Agent, or Firm*—Levenfeld Pearlstein, LLC

(57) ABSTRACT

A nail has a head, a penetrating tip and a shank extending from the head to the penetrating tip. The shank has a circumference and a longitudinal axis. A plurality of rows of deformations formed as teeth are formed in the shank extending outwardly of the shank. The rows are formed in a spiral pattern along the length of the shank from about the head to about the penetrating tip. The rows of teeth are formed parallel to one another and formed at an angle of at least 50 degrees relative to a cross-sectional plane perpendicular to a longitudinal axis of the nail.

21 Claims, 7 Drawing Sheets

DEFORMED SHANK FASTENER

BACKGROUND OF THE INVENTION

This invention pertains to fasteners. More particularly, the invention pertains to a nail with a shank having a plurality of spiral formed deformations configured to increase the holding power of the nail.

Round nails, that is, nails having cylindrical shanks, have been produced for hundreds of years. These are the easiest type of nail to manufacture, because of their symmetrical shape. Moreover, round nails exhibit relatively predictable, uniform properties, such as holding power, when driven into wood.

Holding power, or withdrawal strength, refers to the nail's resistance to an axial force (a load parallel to the nail shank). This includes the nail's resistance to withdrawing from the substrate into which it is driven.

Altering the shape of a nail shank to increase holding power is known. For example, ring shank nails are known, which have peripheral rings formed in the shank. The rings can extend from the head to the driving end or tip of the nail.

Other fasteners have grooves formed longitudinally along the shank. The shape and number of the grooves can vary and can include "star" or other shapes.

Still another nail, disclosed in Lat, U.S. Pat. No. 5,741,104, includes annular rings and a circumferential array of helical grooves that may be deeper or shallower than the annular rings.

While all of these alterations to the shape of the nail increase the holding power of the nail, there is always the potential for pull-out of the nails from the substrate.

Accordingly, inasmuch as there will always be the possibility that a nail will pull out unless the holding power is as great as the inherent strength of the substrate material (e.g., the lumber into which the nail is driven), there is a need for a nail having increased holding power. Desirably, such a nail is fabricated without the need for additional material (in the nail) over that of a standard nail of the same size, and without affecting the other characteristics (e.g., shear strength, hardness) of the nail.

BRIEF SUMMARY OF THE INVENTION

A nail having increased holding power has a head, a penetrating tip, a shank extending from the head to the penetrating tip and having a circumference and a longitudinal axis. The nail has a plurality of rows of deformations, preferably formed as teeth, in the shank extending outwardly of the shank. The rows of teeth are formed in a spiral pattern along the length of the shank from about the head to about the penetrating tip. The rows of teeth are formed parallel to one another and formed at an angle of about 50 degrees to about 80 degrees, and at least 50 degrees relative to a cross-sectional plane perpendicular to a longitudinal axis of the nail.

The teeth are formed with a leading portion tapering toward the shank toward the penetrating tip and a trailing portion having an interference surface oriented toward the head, opposite the leading portion. The teeth can have a generally triangular cross-sectional shape. The triangular cross-sectional shape can be symmetrical.

In a present embodiment, the rows are equally circumferentially spaced from one another. A present nail has five or six rows of teeth.

The nail can be formed as a ring shank nail having circumferential rings formed in the shank. The teeth can be formed integral with the rings. The rings can be spaced from one another a distance that is different from a length of the teeth and different from a multiple of the length of the teeth. The rings can have a height that is less than a maximum height of the teeth.

The teeth can be formed overlapping one another at adjacent leading ends and trailing ends, or the teeth can abut and not overlap one another. A1

Advantageously, the present fastener drives like a nail and acts like a screw. That is, it is driven straight, but rotates as it penetrates the substrate (wood), and it provides high resistance to pull-out.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying illustrations and drawings, wherein.

DETAILED DESCRIPTION OF THE INVENTION

While the present invention is susceptible of embodiment in various forms, there is shown in the drawings and will hereinafter be described several preferred embodiments with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent Office, and does not imply, nor should be inferred to limit the subject matter disclosed herein.

The present invention pertains to a nail 10 having a shank 12 having deformations 14 formed therein. The deformations 14 increase the holding power of the nail 10 (increase resistance to pull-out as compared to a nail having no deformations or alterations in the shank wall.

FIGS. 1A-F through 6A-B illustrate various embodiments of the deformed shank nail 10. In each of the illustrated embodiments, the nails 10 are formed with a plurality of longitudinal helical or spiral rows 16 of outwardly extending projections 14. The projections 14 can be formed as teeth that align, tip 18 to tail 20 in forming each of the helical rows 16a-f (416a-e). The embodiments 10-410 in FIGS. 1A-F though 5A-F have teeth 14-514 formed on an otherwise smooth shank 12 (e.g., common drawn nail).

Referring to FIGS. 1A-1F the deformations 14 (referred to as teeth) are formed at a helix angle $\alpha_{14}$ of about 80 degrees as measured through the longitudinal center axis $A_{14}$ of the teeth 14, relative to cross-sectional plane P perpendicular to the longitudinal $A_{10}$ axis of the fastener 10. The teeth 14 are symmetrical about the center axis $A_{14}$ and have a generally triangular cross-section (see FIG. 1E). The teeth 14 incline away from the tip 18 to form ramped 22 sides that converge at a ridge 24 that defines the peak 26 of the tooth 14. The tip 18 is slightly truncated (where it abuts a prior or forward tooth) and the rear 20 of the tooth 14 has a steep sloping surface 28 to meet the front or tip of the next tooth. A medial portion 30 of the tooth 14 is flat or non-inclined (relative to the tip to tail direction, as indicated at 32).

Figure 1A:
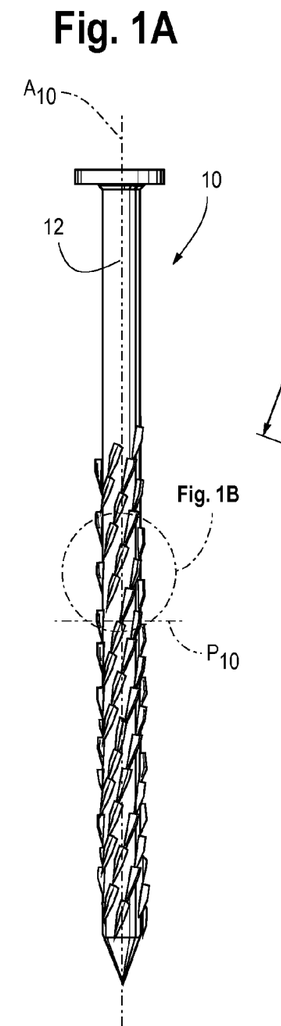
FIGS. 1A-1F are an illustration (FIG. 1A), an enlarged view (FIG. 1B), a cross-sectional view (FIG. 1C, taken along line 1C-1C of FIG. 1B), and details (FIGS. 1D-1F) of an embodiment of a deformed shank nail embodying the principles of the present invention.
Figures 1B, 1D, 1E, 1F:
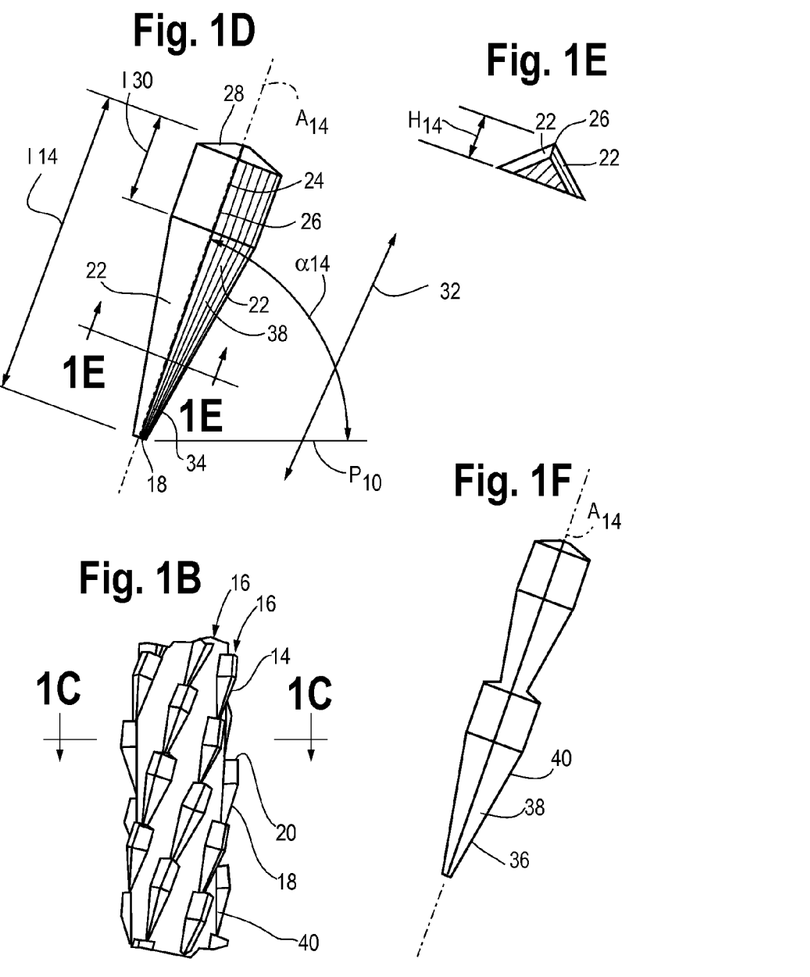
Figure 1C:
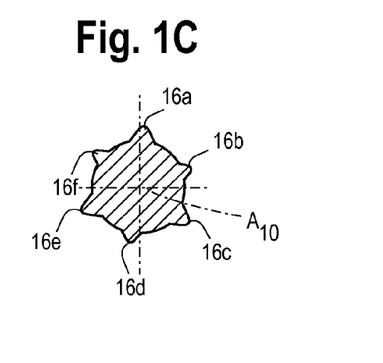
Figures 2A, 2B, 2C, 2D:
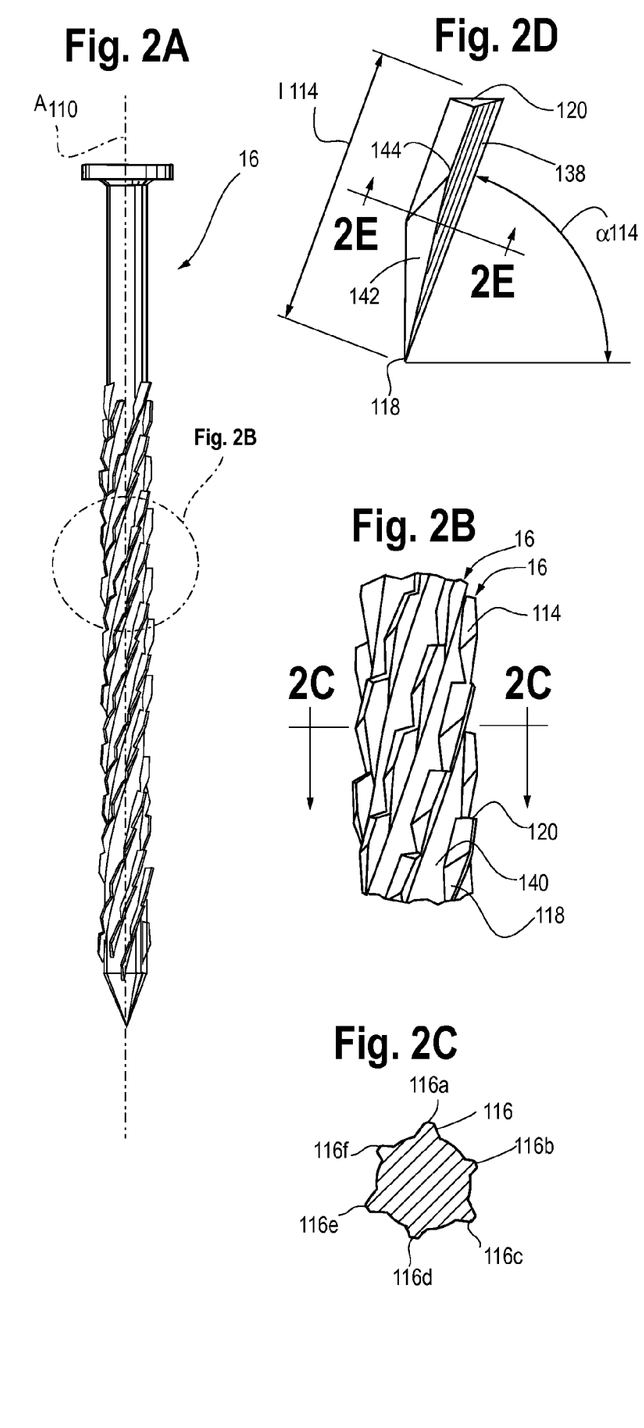
FIGS. 2A-2F are illustrations and views similar to those of FIGS. 1A-1F of an alternate embodiment of the deformed shank nail.
Figure 2E:
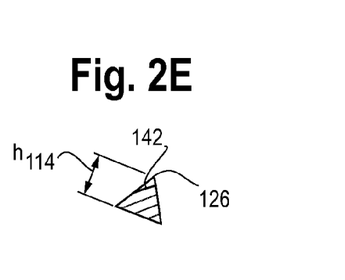
Figure 2F:
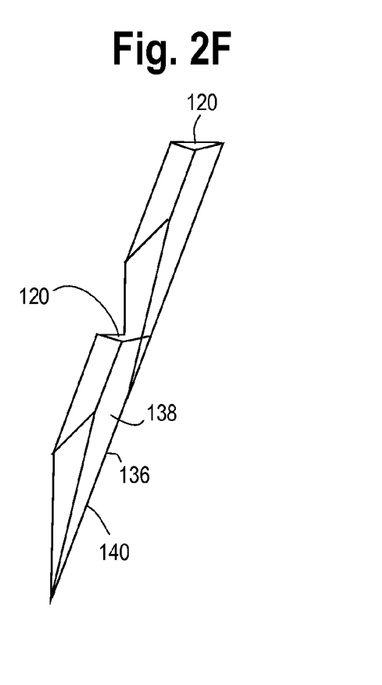
Figure 3A:
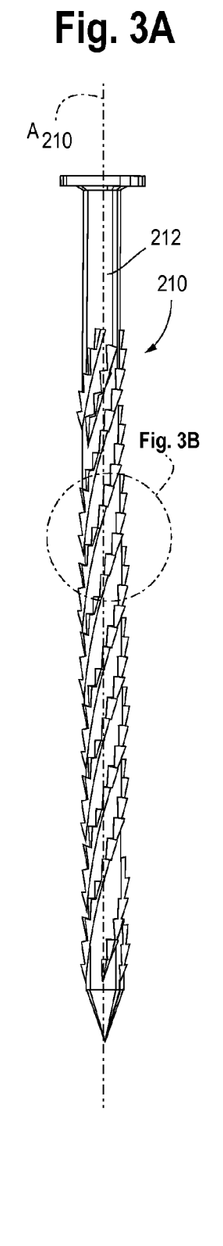
FIGS. 3A-3F are illustrations and views similar to those of the previous figures showing another alternate embodiment of the deformed shank nail.
Figure 3B:
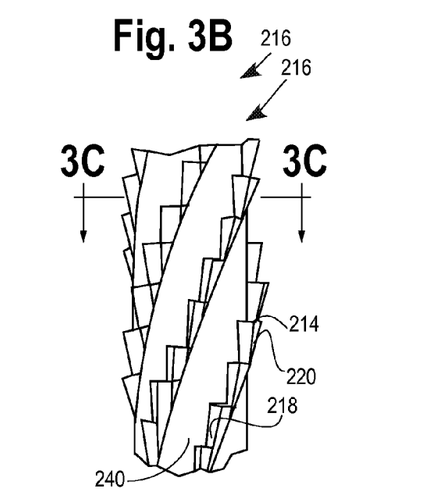
Figure 3C:
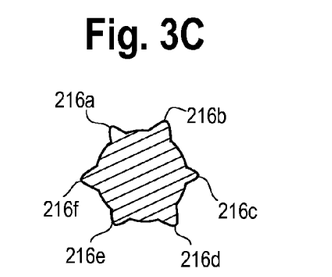
Figures 3D, 3E:
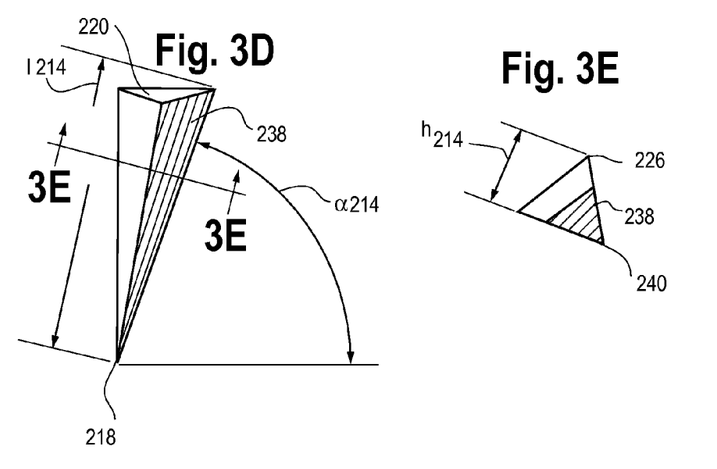
Figure 3F:
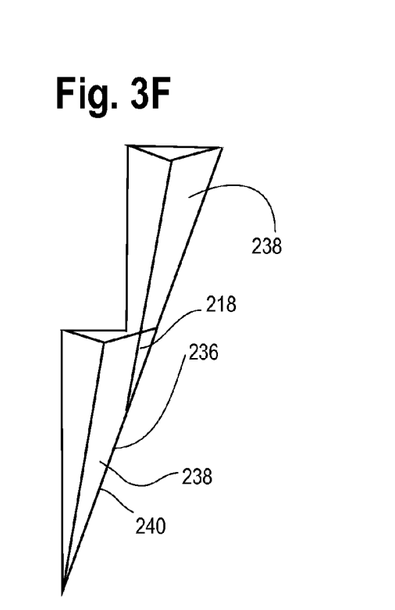
Figure 4A:
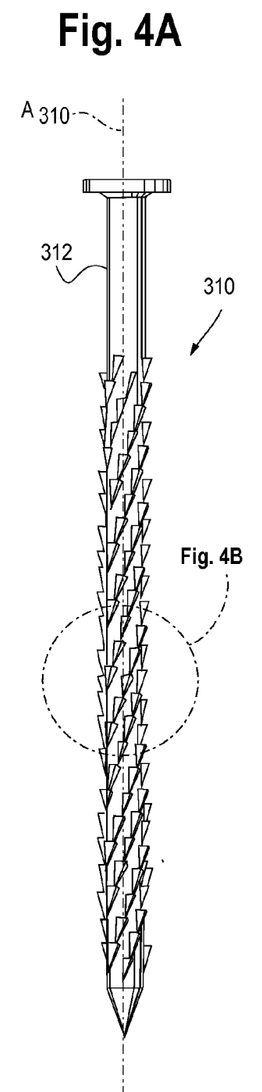
FIGS. 4A-4F are illustrations and views similar to those of the previous figures showing still another alternate embodiment of the deformed shank nail.
Figure 4B:
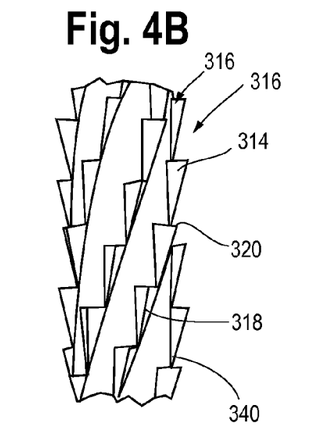
Figure 4C:
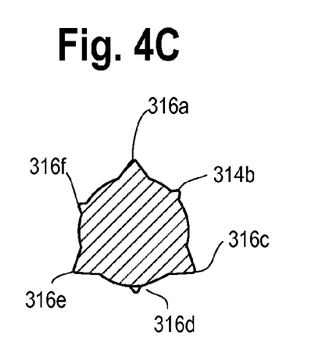
Figure 4D:
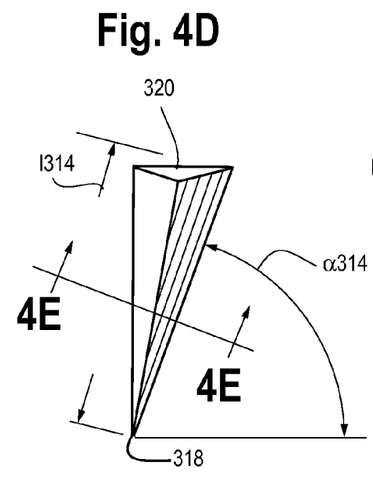
Figure 4E:
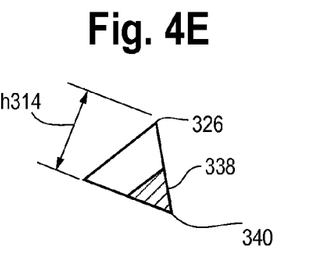
Figure 4F:
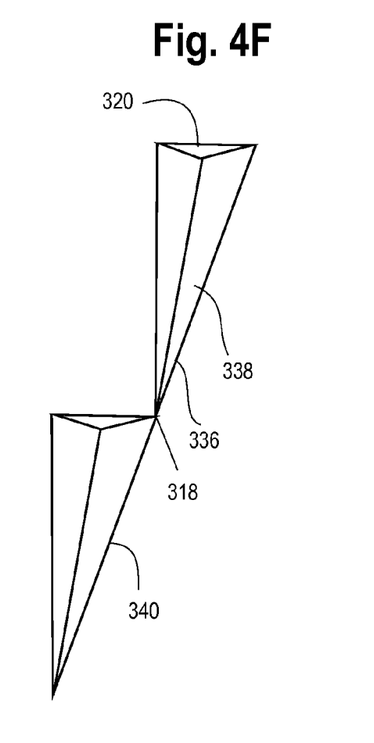

The nail 10 has six helical rows 16 of teeth 14 spaced 60 degrees from one another (see FIG. 1C, which shows the rows 16a-f symmetrically disposed about the shank 12). Three of the rows 16a,c,e (alternating from one another) are about equally spaced, longitudinally, such that a cross-section of a tooth 14 in one row, say 16a at a given longitudinal location on the shank 12 is the same as the tooth 14 in an alternate row, say 16c. In a current 0.120 inch (nominal) diameter nail 10, each tooth 14 has a length $l_{14}$ of about 0.09 inches and a medial portion length $l_{30}$ of about 0.05 inches. The peak height $h_{14}$ of the tooth 14 is about 0.04 inches.

The angle $\alpha_{14}$ of the rows 16 (the helix angle) is relatively steep to promote rotation of the nail 10 as it penetrates the substrate. In this manner, rather than tearing the fibers of the substrate (wood), as the nail 10 penetrates straight into the wood, the nail 10 will rotate and the teeth 14 will follow a path created by the first teeth in each row 16. Essentially, the fastener 10 drives like a nail (it is driven into the substrate straight), but acts like a screw in that it rotates as it penetrates the substrate. As such, the pull-out strength of the nail 10 is higher in that the teeth 14 will meet resistance from whole (as opposed to torn) fibers in the wood, in that the nail 10 will tend to pull out straight, rather than backing out through the spiral path. The ramped or inclined leading surface 34 (creating a wedge shape) permits smooth (less resistance to) penetration of the nail 10 into the wood.

The relatively steep angle of the rear side 20 of the teeth 14 further serves to create a resistance to pull-out of the nail 10. Again, the steep rear-side 20 angle encountering resistance from the non-torn fibers provides a nail 10 that while readily driven into a substrate, has high resistance to pull-out.

As a conventional nail is driven into wood, it parts or separates the fibers that lie adjacent to the to the shank as it penetrates the wood. Some of the fibers will, of course, fracture (perhaps those that directly intersect the shank), otherwise, the fibers generally part or separate as the nail penetrates the wood. In turn, as the conventional nail is withdrawn, the smooth surface of the shank readily slides past the separated fibers and the vast majority of the fiber structure remains intact.

With the present fastener 10, because the fastener 10 rotates as it is driven into the substrate, it too separates the fibers at it penetrates the wood. However, as the fastener 10 is pulled out of or withdrawn from the wood, the rear side 20 of the teeth 14 provide a resistance in the form of an interference surface against withdrawal. As such, as the fastener 10 is withdrawn (withdrawal would be straight), a significant and substantial amount of debris in the form of destroyed wood fibers is generated, and is generated 360 degrees peripherally around the fastener.

It is also believed, without being held to theory, that as the present fastener 10 rotates during penetration, the pressure flank 38 of the teeth 14 exert a force oil the wood fibers forward of the teeth 14 with which they interact. The force exerted by the pressure flank 38 tends to compress the fibers forward of the flank 38, in part, against the interference face (rear side) 20 of the lower teeth 14. The compressed fibers create an even greater interference against pull out of the fastener 10.

As can be seen from FIG. 1C, the cross-section normal to the axis $A_{10}$ of the nail 12, the rows 16 are aligned so as to form identical or near identical tooth cross-sections in alternating rows, e.g., 16a,c,e at any point along the nail shank 12. The line 36 formed by the juncture of the pressure flank 38 and the shank 12 (at the root 40 of the tooth 14) is an undulating spiral line.

FIGS. 2A-F illustrate a nail 110 having an asymmetrical compound cut tooth 114. The tooth 114 has a downward or pressure flank 138. A lead angle $\alpha_{114}$ defined by the line 136 at the juncture of the pressure flank 138 and the shank 112 (at the root 140 of the tooth 114) is about 70 degrees. The lead angle $\alpha_{114}$ is not measured along the peak 126 of the tooth 114 in that the peak 126 (line) has a slight turn at the end of the compound cut face 142 (as indicated at 144).

In the current 0.120 inch (nominal) diameter nail 110, each tooth 114 has length $l_{114}$ of about 0.12 inches and a tooth height $h_{114}$ at its peak 126 of about 0.02 inches. As can be seen from the cross-section normal to the axis $A_{112}$ of the shank 112 (see FIG. 2C), the rows 116 are aligned so as to form identical or near identical tooth cross-sections in alternating rows, e.g., 116a,c,e at any point along the nail shank 112. Unlike the nail 10 of FIGS. 1A-F, in this embodiment 210, the line 136 formed by the juncture of the pressure flank 138 and the shank 112 (at the root 140 of the tooth 114) is a straight spiral line, and does not undulate. The teeth 114 overlap somewhat such that the leading end or tip 118 of each tooth 114 is subsumed within the trailing end or tail 120 of a prior tooth.

FIGS. 3A-F illustrate a nail 210 having a symmetrical tooth 214 when viewed in cross-section normal to the peak 226 line of the tooth 214. The downward edge 246 (the edge of the pressure flank 238 and the root 240) is longer than the upward edge 248, and the rear side 220 of the tooth 214 is formed with a surface normal to the longitudinal axis $A_{210}$ of the nail 210. This results in a increased resistance to pull-out of the nail 210. As can be seen from the cross-section normal to the axis $A_{210}$ of the nail (FIG. 3B), the rows 216a-f are aligned so as to form identical or near identical tooth 214 cross-sections in each of the rows 216a-f at any longitudinal point along the nail shank 212. The teeth 214 each have a length $l_{214}$ of about 0.08 inches and a tooth height $h_{214}$ at its peak 226 of about 0.03 inches The teeth 214 overlap somewhat such that the leading end 218 of each tooth 214 is subsumed within the trailing end 220 of each prior tooth. Again, the line 236 formed by the juncture of the pressure flank 238 and the shank 212 (at the root 240 of the tooth 214) is a straight spiral line.

FIGS. 4A-F illustrate a nail 310 having a tooth 314 similar to the embodiment 210 of FIGS. 3A-F, but with the teeth 314 staggered so that alternating rows e.g., rows 316a,c,e, (again, rather than all of the rows 316a-f) are similarly positioned longitudinally. Accordingly, the rows 316a,c,e and 316b,d,f are aligned so as to form identical or near identical tooth 314 cross-sections in the alternating rows at any point along the nail shank 312.

In this embodiment, the teeth 314 are tip 318 to tail 320 with no overlap of teeth 314 with one another. That is, the leading end 318 of each tooth 314 tapers substantially smoothly down to the shank 312. Again, the line 336 formed by the juncture of the pressure flank 338 and the shank 312 (at the root 340 of the tooth 314) is a straight spiral line. The teeth 314 each have a length $l_{314}$ of about 0.11 inches (there is no overlap) and a tooth height $h_{314}$ at its peak 326 of about 0.03 inches.

FIGS. 5A-F illustrate another embodiment of the nail 410 with the teeth 414 formed at a shallower angle α414 than the teeth of the previous nails. In this embodiment 410, five rows 416a-e of teeth can be aligned so as to form identical or near identical tooth 414 cross-sections in each row 416a-e at any point along the nail shank 412. Alternately, the teeth can be staggered so that the "height" repeats every fifth tooth (that is, each tooth is offset from each other by about 20 percent of the tooth's height—longitudinally along the shank).

Lengthwise or longitudinally, The teeth 414 overlap with the prior and subsequent teeth and as such, the leading end 418 of each tooth 414 is subsumed within the trailing end 420 of each prior tooth. The teeth 414 each have a length $l_{414}$ of about 0.05 inches (due to the overlap and the shallower angle $α_{414}$) and a tooth height $h_{414}$ at its peak 426 of about 0.03 inches. As seen in FIG. 5B, the pressure flank 438 rise is steep as it rises from the shank 412. Once again, the line 436 formed by the juncture of the pressure flank 438 and the shank 412 (at the root 440 of the tooth 414) is a straight spiral line.

Figure 5A:
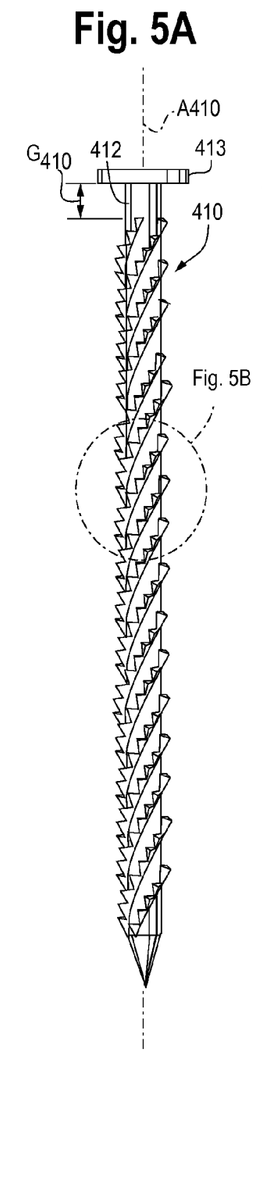
FIGS. 5A-5F are illustrations and views similar to those of the previous figures showing yet another alternate embodiment of the deformed shank nail.
Figure 5B:
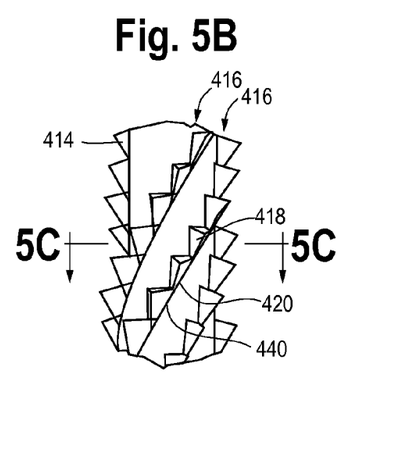
Figure 5C:
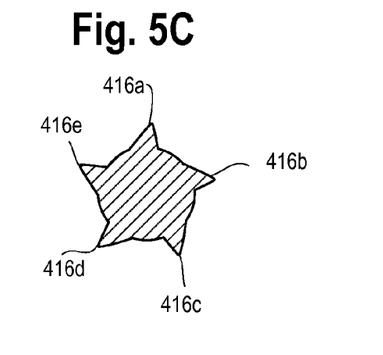
Figure 5D:
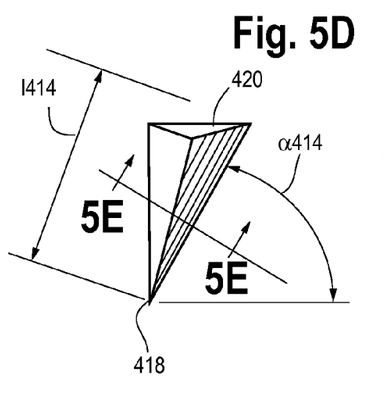
Figure 5E:
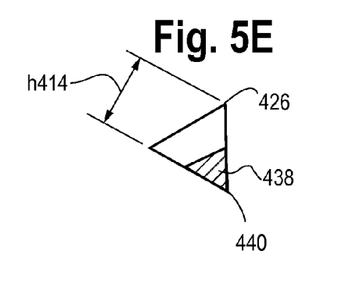
Figure 5F:
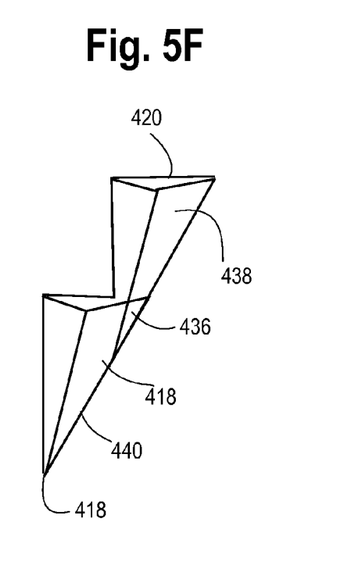

This shape of tooth 414 can also be configured in a six row arrangement (not shown) in which the teeth are all at the same height as in the cross-section illustrated in FIG. 5C, or are formed at two heights offset from one another by about ½ of the tooth height.

Figure 6A:
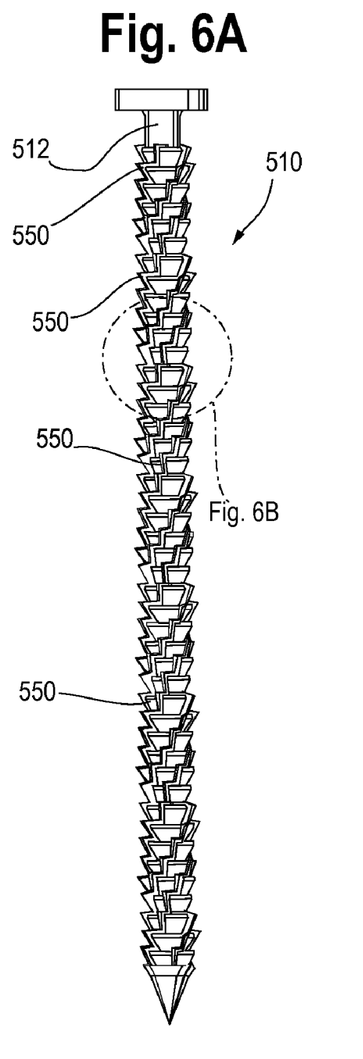
FIGS. 6A-6B illustrate yet another alternate embodiment of the deformed shank nail.
Figure 6B:
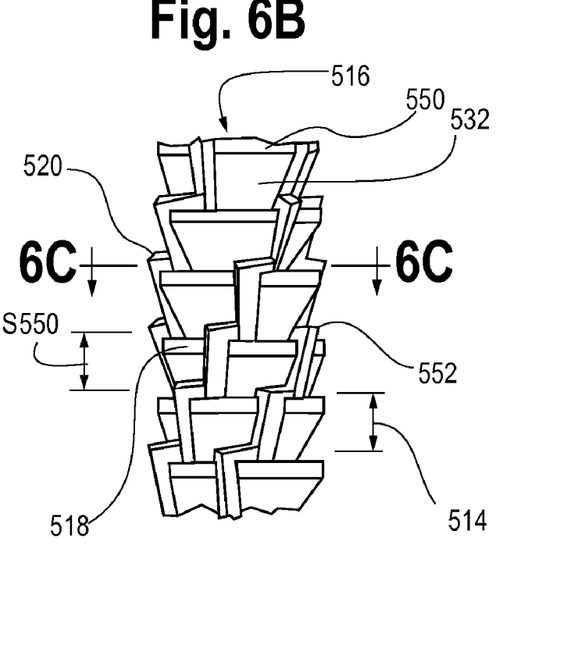

Another embodiment 510 is illustrated in FIGS. 6A-B. In this embodiment, the teeth 514 are formed in the same manner as in the embodiment 410 of FIGS. 5A-F. The nail 510 has an additional feature in that the shank 512 is formed as a ring shank nail.

As seen in FIG. 6B, rings 550 are formed as sloped or inclined surfaces 552 on which the teeth 514 are formed. The teeth 514 have the same profile as those of the embodiment 410 in FIGS. 5A-F, but the rings 550 are interspersed along the shank 512 length. Because the rings 550 have a spacing $S_{550}$ that is different from the length $l_{514}$ of the teeth 514, the teeth 514 reside at different locations along the length of the shank 512 than the rings 550. The ring spacing $S_{550}$ can be such that it is different from the tooth length $l_{514}$ and is different from a multiple of the teeth length $l_{514}$.

In each of the embodiments 10-510, it has been found that the helical or spiral nature of the rows 16-516 of teeth 14-514 promote rotation of the nail 10-510 as it penetrates the substrate (wood). At the same time, the back (interference) surface 20-520 of the teeth 14-514 tend to create substantial resistance to pullout of the nail 10-510 by interference between the tooth back surface 20-520 and the fibers of the wood or substrate. And, in the combination ring-shank, toothed deformed shank nail 510, the rings 550 create even greater resistance to pull-out by making use of the spaces between the teeth 514 (that are otherwise flat-forming the shank surface—and parallel to the direction of withdrawal) to provide features (ridges) that interfere withdrawal. Again, essentially, the present fastener 10-510 drives like a nail (is driven straight), but acts like a screw.

The tendency of the spiral rows 16-516 to effect rotation of the nail 10-510 is intended to reduce the amount of wood fibers that are torn or sheared by the penetrating nail 10-510. Nevertheless, there is still some level of fiber tearing or shearing that occurs. The inclined surfaces 552 of the rings 550 facilitate penetration of the nail 510 and reduce the tearing or shearing of the wood fibers as it goes in, but provides a substantial resistance to (interference form) being withdrawn.

Samples of fasteners in accordance with the present invention, and specifically, as illustrated in FIGS. 5A-F, were compared to a known standard wood screw. Present fasteners and standard wood screws were sampled to determine the withdrawal strength in "SPF" (spruce/pine/fir soft wood) at 10 percent and 12 percent moisture (of the wood). Present fasteners and standard wood screws were also sampled to determine the withdrawal strength in "LVL" (laminated veneer lumber-hard wood). Both of these wood species are used for floor joists in the construction of homes. The results are presented in TABLE 1 below.

TABLE 1

COMPARISON OF WITHDRAWAL STRENGTH OF DEFORMED SHANK FASTENER AND STANDARD WOOD SCREW IN LUMBER STOCK

| Fastener | Wood Species | Wood Moisture (%) | Withdrawal Strength (lbs.) |
| --- | --- | --- | --- |
| Deformed Shank Fastener | Spruce/Pine/Fir SPF | 10 | 580 |
| Standard Wood Screw | Spruce/Pine/Fir SPF | 10 | 666 |
| Deformed Shank Fastener | Spruce/Pine/Fir SPF | 12 | 380 |
| Standard Wood Screw | Spruce/Pine/Fir SPF | 12 | 387 |
| Deformed Shank Fastener | Laminated Veneer Lumber-LVL | 5 | 783 |
| Standard Wood Screw | Laminated Veneer Lumber-LVL | 5 | 816 |

As can be seen from TABLE 1, the present deformed shank fastener exhibits about equal (slightly lower, about 12 percent and 2 percent, respectively) withdrawal strength compared to the standard wood screw in 10 and 12 percent moisture soft wood (SPF) and also about equal (again, slightly lower, about 4 percent) withdrawal strength in laminated veneer at 5 percent moisture. It is has also been observed that at higher moisture levels, which is usually the case with newly built homes, the withdrawal values of the deformed shank fastener and the standard wood drive screw are even closer than in lower moisture content wood. And, in hard woods, which are used in about 50 percent of the homes built, again, the difference in withdrawal strength of the deformed shank fastener and the standard wood screw are lower.

It will, also, be appreciated that the present deformed shank fastener can be driven into the wood (substrate) in about ¼ of the time required to drive the screw (the difference between a straight drive and a rotating drive), and the cost for the present deformed shank fastener is anticipated to be considerably less than the standard wood screw.

Squeaking in wooden floors is unfortunately a rather common occurrence. Squeaking occurs when the smooth shank of a fastener slides against the wood surface (fibers). A fastener with threads (to engage the wood fibers) is the ideal condition for anti-squeaking.

Figure 7:
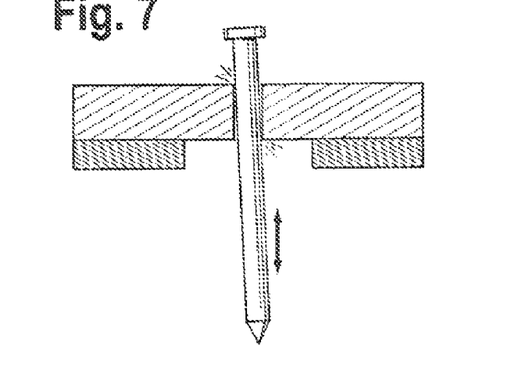
FIG. 7 is an illustration of one condition, a crooked or askew nail, that can cause floor squeaking.
Figure 8:
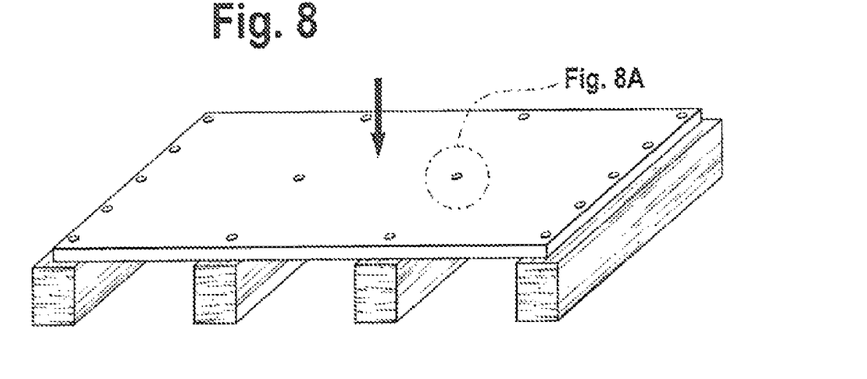
FIG. 8 is an illustration of another condition, warped boards, that can cause floor squeaking.
Figure 8A:
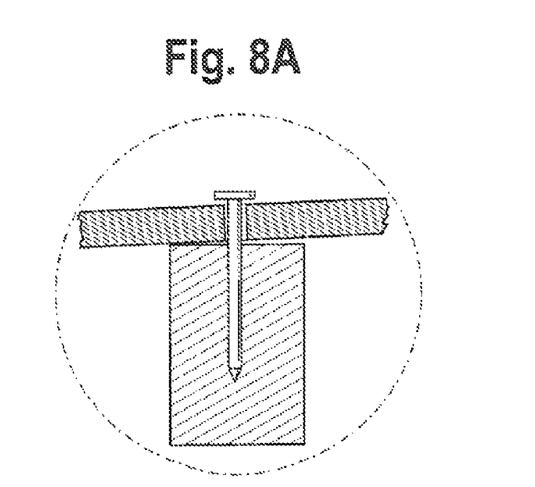

A nail squeak testing fixture was configured to evaluate samples of the present deformed shank fastener. The fixture was configured to simulate conditions that cause squeaking in wood floors of homes, such as when the fastener is slightly bent or askew (FIG. 7), when the floorboard and/or the wood support member are warped (as illustrated in FIG. 8), or low moisture in the wood for example, when furnaces are turned on. While the wood floor board is held fixed, the fastener was caused to oscillate with an amplitude of about 0.080 inches at a frequency of about 2 Hz.

The present deformed shank fastener (again, that illustrated in FIGS. 5A-F), which has very little smooth surface as indicated at $G_{410}$ in FIG. 5A (⅛" or less between the end of the thread and the head 413) exhibited no squeaking when evaluated in the nail squeak test fixture. Those skilled in the art will recognize that there are many different interferences or shapes that can be formed in the fastener in order to reduce or eliminate the smooth surface on the fastener between the head and the end of the threads, such as ring and the like, and that such other smooth-surface reducing shapes are within the scope and spirit of the present invention.

It will also be appreciated that the present fastener 10-510 can be coated to permit the fastener to be driven into a substrate with less force than an uncoated fastener. The reduction in force is advantageous in that a lowered powered drive (e.g., lower air pressure tool) can be used to install the fasteners, and/or more fasteners can be driven from a single charge (e.g., with a cordless tool).

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A nail comprising:
   a head;
   a penetrating tip;
   a shank extending from the head to the penetrating tip and having a circumference and a longitudinal axis; and
   a plurality of rows of deformations in the shank extending outwardly of the shank, the rows formed in a spiral pattern along the length of the shank from about the head to about the penetrating tip, the rows of deformations being formed parallel to one another and formed at an angle of at least 50 degrees, as measured along a lead angle defined at a base of the deformation and the shank, relative to a cross-sectional plane perpendicular to a longitudinal axis of the nail, the deformations in each row being substantially contiguous with adjacent deformations in the same row, each of the deformations defining an outline shape where it is joined to the shank, that shape including at least a portion that is tapered along the spiral in a direction of the penetrating tip.

2. The nail in accordance with claim 1 wherein the deformations are formed as teeth extending outwardly from the shank.

3. The nail in accordance with claim 2 wherein the teeth are formed with a leading portion tapering toward the shank toward the penetrating tip and a trailing portion having an interference surface oriented toward the head, opposite the leading portion.

4. The nail in accordance with claim 3 wherein the teeth overlap one another at adjacent leading ends and trailing ends.

5. The nail in accordance with claim 3 wherein the teeth abut and do not overlap one another at adjacent leading ends and trailing ends.

6. The nail in accordance with claim 1 wherein the teeth have a generally triangular cross-sectional shape.

7. The nail in accordance with claim 6 wherein the shape is a symmetrical cross-sectional shape.

8. The nail in accordance with claim 1 wherein the rows are equally circumferentially spaced from one another.

9. The nail in accordance with claim 1 wherein the angle is about 50 degrees to about 80 degrees.

10. The nail in accordance with claim 1 including five rows of deformations.

11. The nail in accordance with claim 10 wherein the deformations are equally circumferentially spaced about the shank.

12. The nail in accordance with claim 1 including six rows of deformations.

13. The nail in accordance with claim 1 wherein the nail is a ring shank nail having circumferential rings formed in the shank, the deformations being formed as teeth formed integral with the rings.

14. The nail in accordance with claim 13 wherein the rings are formed spaced from one another a distance that is different from a length of the teeth and a multiple of a length of the teeth.

15. The nail in accordance with claim 1 wherein the deformations commence on the shank spaced a predetermined distance from the head.

16. The nail in accordance with claim 15 wherein the predetermined distance is less than or equal to about ¼ inch.

17. The nail in accordance with claim 16 wherein the predetermined distance is less than or equal to about ⅛ inch.

18. The nail in accordance with claim 15 including interference formations in the shank between the deformations and the head.

19. The nail in accordance with claim 18 wherein the spiral is formed at an angle of about 50 degrees to about 80 degrees relative to a cross-sectional plane perpendicular to a longitudinal axis of the nail.

20. A nail comprising:
    a head;
    a penetrating tip;
    a shank extending from the head to the penetrating tip and having a circumference and a longitudinal axis; and
    a plurality of spiral pattern rows of deformations in the shank extending outwardly of the shank, the rows configured to impart a rotating motion to the nail as the nail is driven into a substrate, the deformations including a lead angle of about 50 degrees defined at a base of the deformation and the shank, an inwardly tapered leading end and an interference face trailing end to provide a resistance to withdrawal of the nail after being driven into the substrate, the deformations in each row being substantially contiguous with adjacent deformations in the same row, each of the deformations defining an outline shape where it is joined to the shank, that shape including at least a portion that is tapered along the spiral in a direction of the penetrating tip.

21. The nail in accordance with claim 20 including five rows of deformations formed as teeth.

* * * * *

UNITED STATES PATENT AND TRADEMARK OFFICE
CERTIFICATE OF CORRECTION

| | | |
|---|---|---|
| PATENT NO. | : 7,819,614 B2 | |
| APPLICATION NO. | : 12/138180 | |
| DATED | : October 26, 2010 | |
| INVENTOR(S) | : Anthony M. Versino et al. | |

It is certified that error appears in the above-identified patent and that said Letters Patent is hereby corrected as shown below:

Column 3, Line 39: The words "perm" and "its" should be removed and replaced with the word "permits".

Column 3, Line 66: The word "oil" should be removed and replaced with the word "on".

Signed and Sealed this
Eleventh Day of January, 2011

David J. Kappos
*Director of the United States Patent and Trademark Office*